United States Patent [19]

Dopyera et al.

[11] Patent Number: 4,618,173
[45] Date of Patent: * Oct. 21, 1986

[54] SWIVEL COUPLING ELEMENT

[75] Inventors: Emil E. Dopyera; Jack E. Miller, both of Houston, Tex.

[73] Assignee: Big-Inch Marine Systems, Inc., Houston, Tex.

[*] Notice: The portion of the term of this patent subsequent to May 3, 2000 has been disclaimed.

[21] Appl. No.: 661,875

[22] Filed: Oct. 17, 1984

Related U.S. Application Data

[63] Continuation of Ser. No. 271,114, Jun. 8, 1981, abandoned, which is a continuation-in-part of Ser. No. 196,527, Oct. 14, 1980, Pat. No. 4,381,871.

[51] Int. Cl.[4] .................................................. F16L 27/06
[52] U.S. Cl. .................................... 285/261; 285/263; 285/368; 29/157 R
[58] Field of Search ................ 285/263, 261, 160, 166, 285/167, 368; 29/157 R

[56] References Cited

U.S. PATENT DOCUMENTS

| | | |
|---|---|---|
| 1,057,939 | 4/1913 | Cooper . |
| 2,456,744 | 12/1948 | Sjoberg . |
| 2,519,147 | 8/1950 | Miller . |
| 2,564,938 | 8/1951 | Warren . |
| 2,833,566 | 5/1958 | Meyer et al. . |
| 3,178,207 | 4/1965 | Fox et al. . |
| 3,477,748 | 11/1969 | Tinsley . |
| 3,746,372 | 7/1973 | Hynes et al. . |
| 3,860,271 | 1/1975 | Rodgers . |
| 3,874,706 | 4/1975 | Arnold . |
| 4,012,060 | 3/1977 | Reneau . |
| 4,068,864 | 1/1978 | Herbert et al. ................. 285/263 X |
| 4,082,320 | 4/1978 | Weinhold ....................... 285/261 X |
| 4,129,306 | 12/1978 | Konno et al. . |
| 4,153,281 | 5/1979 | Ahlstone ........................ 285/263 X |
| 4,180,285 | 12/1979 | Reneau ............................... 285/261 |
| 4,195,865 | 4/1980 | Martin ............................ 285/263 X |

FOREIGN PATENT DOCUMENTS

| | | |
|---|---|---|
| 261434 | 6/1913 | Fed. Rep. of Germany . |
| 821890 | 11/1951 | Fed. Rep. of Germany . |
| 2737621 | 2/1979 | Fed. Rep. of Germany . |
| 811007 | 1/1937 | France . |
| 1097267 | 1/1968 | United Kingdom . |

OTHER PUBLICATIONS

Gripper, Inc., Ball Connector-Flange Lok, No. 75-0068, Bulletin-Jan.-1976.
Hydrotech, "Misaligning Flange", p. 3925, SK-950.
Lyntech Corp., Elastallic Spherical Connector, 3 pages.

Primary Examiner—Thomas F. Callaghan
Attorney, Agent, or Firm—Arnold, White & Durkee

[57] ABSTRACT

A swivel coupling element for use in sealingly coupling a tubular element to an annular coupling flange. The swivel coupling element includes an annular mounting flange having a leading end which defines a seating face for seating on the seating face of such an annular coupling flange, the annular mounting flange being shaped to define a segmental spherical surface which is on the trailing side of the leading end of the annular mounting flange, a tubular member having a trailing end for connection to a tubular element, and having a leading end pivotally positioned in the bore of the mounting flange, the leading end having a convex segmental spherical outer surface which is complementary to the concave segmental spherical surface of the mounting flange to cooperate therewith, and an annular retainer flange which is located on the tubular member and which is displaceable relatively to the mounting flange between an unlocked position where the tubular member is free to pivot or swivel relatively to the mounting flange, and a locked position where the leading end of the tubular member is fixed in the bore of the mounting flange.

55 Claims, 4 Drawing Figures

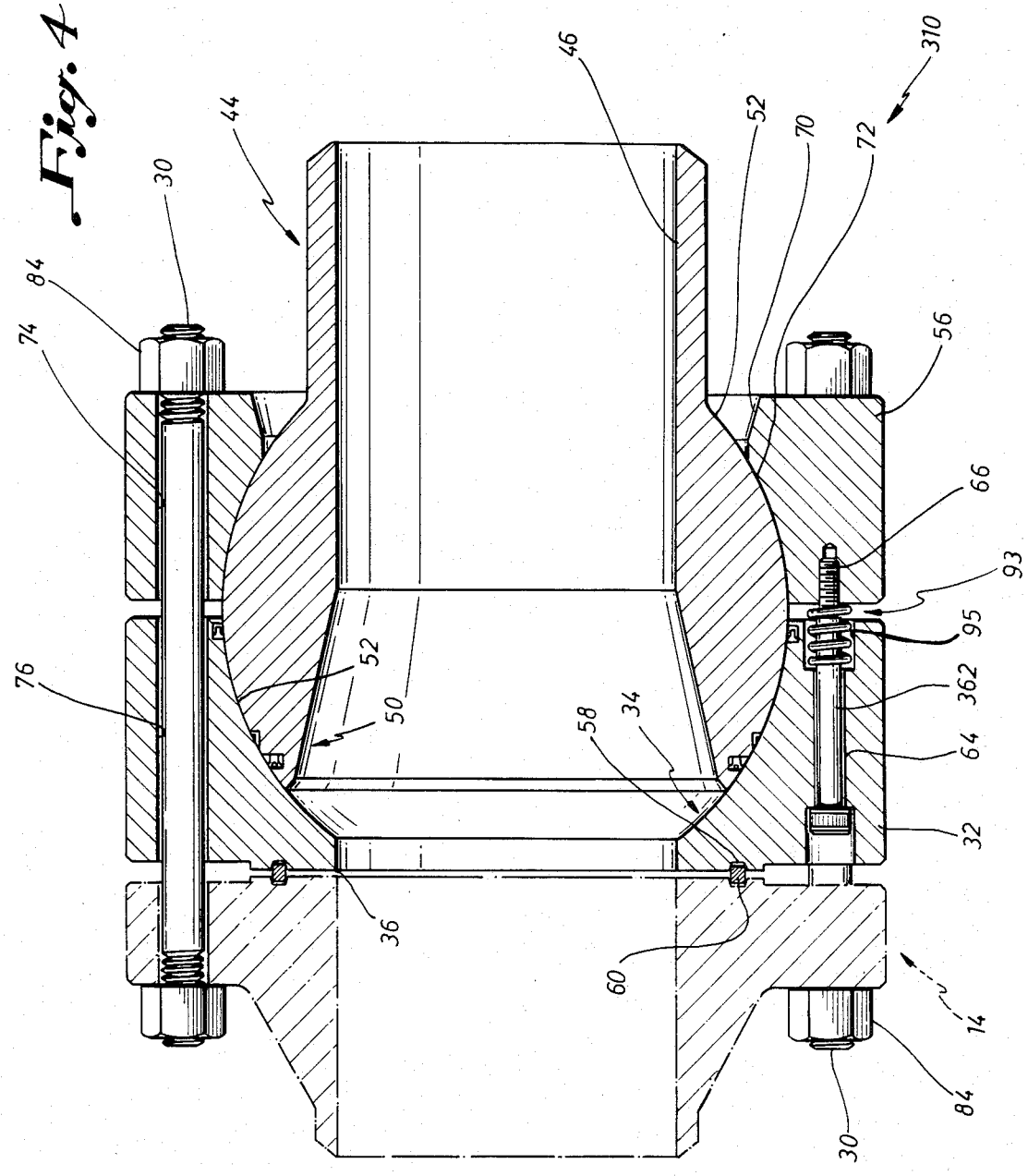

SWIVEL COUPLING ELEMENT

CROSS REFERENCE TO RELATED APPLICATION

This application is a continuation of application Ser. No. 271,114, filed June 8, 1981, which was a continuation-in-part of application Ser. No. 196,527, filed Oct. 14, 1980 now U.S. Pat. No. 4,381,871.

This invention relates to a swivel coupling element and to a swivel coupling including such a swivel coupling element. More specifically, this invention relates to a swivel coupling element for use in sealingly coupling a tubular element to an annular coupling flange, and to a swivel coupling for use in coupling two tubular elements in sealed relationship.

Various types of swivel couplings are known for use in coupling tubular elements in sealed relationship. While swivel couplings may be used for coupling tubular elements which are in line, swivel couplings find particular utility in coupling tubular elements which are mis-aligned.

The types of swivel couplings which are known to applicants all comprise an annular coupling flange having a trailing end for connection to a tubular element, having an annular seating face at its leading end, and having a bore which diverges from the trailing end to the leading end of the coupling flange to define a concave recess which is directed towards the leading end of the coupling flange. Such swivel couplings further comprise a tubular member having a trailing end for connection to a tubular element and a leading end of convex segmental spherical configuration for location in the recess of the coupling flange. Such swivel couplings further comprise an annular retainer flange which cooperates with the leading end of the tubular member, and which can be bolted to the coupling flange to complete the coupling and fix the leading end of the tubular member in the recess of the coupling flange.

These prior art swivel couplings present a number of material disadvantages. Some of these are specified below.

A first disadvantage of the prior art swivel couplings is that a swivel coupling flange must be specifically designed for use with the particular tubular element so that the convex segmental spherical surface of the tubular element can be sealingly located in the concave recess of the coupling flange. Thus once the tubular member has had its trailing end connected to a tubular element, that tubular element can only be coupled to another tubular element if that other tubular element has such a specifically designed coupling flange connected thereto. In practice, however, the situation frequently occurs that one tubular element already has a conventional coupling flange mounted thereon. Such a conventional coupling flange will have a conventional seating face, such as a raised face, a flat face or the like. It follows therefore that when a connection must be made with a second tubular element which is mis-aligned, the prior art swivel couplings can only be used if the conventional coupling flange is removed and replaced by the specially designed coupling flange of the swivel coupling.

A further material disadvantage of the prior art swivel couplings, is that the leading end of the tubular member requires axial translation to draw the leading end axially into the concave recess of the coupling flange. This is a significant disadvantage where the swivel coupling is used in difficult or hazardous environments such as in connection with tubular elements in the form of marine pipelines and particularly subsea pipelines. In forming such a coupling, due allowance must therefore be made in the piping for axial displacement of the piping while the leading end of the tubular member is drawn into the recess of the coupling flange.

A further disadvantage provided by the prior art swivel couplings, is that because of the axial displacement required to draw the ball of the leading end of the tubular member into the recess of the mounting flange, if the two tubular elements which are to be coupled by means of the coupling are misaligned, the degree of misalignment will change as axial displacement occurs during formation of the coupling. This can therefore have the effect of imposing a bending strain on the completed coupling itself, and on the connected tubular elements.

The prior art swivel couplings provide the further disadvantage, particularly when marine pipelines having substantial diameters such as 4 feet or more, are to be coupled. The retainer flange of such a prior art coupling, which is loosely located on the leading end of the tubular member, has a substantial mass. This makes it extremely difficult and virtually impossible for larger diameter sizes, for a diver in a subsea environment to displace the retainer flange axially on the tubular member into a position where it is over the leading end of the tubular member for bolting onto the coupling flange having the recess for receiving the leading end of the tubular member.

It is accordingly an object of this invention to provide a swivel coupling and a swivel coupling element which can substantially reduce at least some of the enumerated disadvantages of the prior art couplings.

According to this invention there is provided a swivel coupling element for use in sealingly coupling a tubular element to an annular coupling flange, the swivel coupling element comprising:

an annular mounting flange having a leading end which defines a seating face for seating on a seating face of such an annular coupling flange when the swivel coupling element and such an annular coupling flange are coupled together;

the annular mounting flange being shaped to define a segmental spherical surface which is on the trailing side of the leading end of the annular mounting flange;

a tubular member having a trailing end for connection to a tubular element, and having a leading end having a segmental spherical surface which is complementary to the segmental spherical surface of the mounting flange to cooperate therewith; and an annular retainer flange which is located on the tubular member and which is displaceable relatively to the mounting flange between an unlocked position where the tubular member is free to swivel or pivot relatively to the mounting flange, and a locked position where the tubular member is fixed relatively to the mounting flange with the segmental spherical surfaces sealingly engaged with each other.

In one preferred embodiment of the invention the segmental spherical surface of the mounting flange may be defined by a bore of the mounting flange which extends from the leading end and which diverges outwardly away from the leading end to define a concave segmental spherical surface which is directed towards the trailing end of the mounting flange, and the complementary segmental spherical surface of the tubular member may be a convex outer surface of the leading end of the tubular member.

The leading end of the mounting flange may conveniently be planar or raised to define a planar or raised seating face for seating on a planar or rasied seating face of a conventional annular coupling flange.

If desired, however, the leading end of the mounting flange may be designed to define a seating face which will cooperate with the seating face of the types of annular coupling flanges currently in use in the particular location where the swivel coupling element is to be used.

The retainer flange may preferably be connected to the mounting flange to hold the leading end of the tubular member captive in the bore of the mounting flange thereby locating both the mounting flange and the retainer flange in position on the leading end of the tubular member for effective use when a coupling is to be formed.

In this embodiment of the invention, the retainer flange will preferably be connected to the mounting flange to allow limited axial displacement of the retainer flange relatively to the mounting flange between its locked and unlocked positions.

While the retainer flange may be connected to the mounting flange by any conventional means known to those skilled in the art, the retainer flange may, in one embodiment of the invention, be connected to the mounting flange by means of bolts which extend slidably through holes in the retainer flange and are engaged in threaded bores provided in the mounting flange, or vice-versa. By adjusting the bolts, the degree of relative axial displacement between the mounting flange and the retainer flange can be adjusted.

In an alternative embodiment of the invention the retainer flange may be connected to the mounting flange by means of a threaded retainer ring which is mounted on the retainer flange and engages with a radially extending shoulder of the mounting flange to permit limited relative axial displacement while preventing separation of the mounting and retainer flanges.

The swivel coupling element of this invention may include spacing means which is operative while the retainer flange is in its unlocked position to facilitate rotation and/or swivel motion of the tubular member relatively to the mounting flange before the retainer flange is displaced into its locked position.

The spacer means may conveniently be operative between the mounting flange and the retainer flange to maintain them in an appropriate relatively spaced relationship for the tubular member to be easily rotated and swiveled or otherwise aligned prior to mounting of the coupling element onto a conventional annular coupling flange.

In an alternative embodiment of the invention, the spacer means may be operative between the tubular element and the retainer flange and/or between the tubular element and the mounting flange.

In a preferred embodiment of the invention the spacer means may be in the form of bias means. The bias means is preferably operative between the mounting flange and the retainer flange.

The bias means may conveniently be adjustable to provide for the tubular member to be located under a controlled amount of friction between the retainer flange and the mounting flange to facilitate setting up of the coupling element for use.

By locating the tubular member under a controlled degree of friction, the tubular member can be displaced into a particular orientation and will tend to hold that orientation without swinging freely. At the same time, the resistance to rotation and to swivel action will be controllable to provide for effective use.

In one preferred embodiment of the invention where the coupling element includes bolts which connect the retainer flange to the mounting flange, the bias spacer means may be in the form of spacer springs which are located on such bolts. The bolts will thereby be in the form of preload bolts wherein the bias effect of the spacer springs can be adjusted by adjusting the engagement between the bolts and the retainer flange or mounting flange, as the case may be.

In a preferred embodiment of the invention the retainer flange may be adapted to be engaged with such an annular coupling flange to couple the swivel coupling element to such a coupling flange.

While the retainer flange may be adapted to be engaged with such an annular coupling flange by any conventional means known to those skilled in the art, in a preferred embodiment of the invention, the retainer flange has a plurality of circumferentially spaced stud holes for cooperating with bolts or studs which extend through correspondingly arranged stud holes of such an annular coupling flange, for bolting the retainer flange to such an annular coupling flange.

In this embodiment of the invention, the mounting flange may conveniently have a plurality of corresponding stud holes for alignment with the stud holes of the retainer flange so that bolts or studs which are used to complete the coupling, will additionally extend through the stud holes of the mounting flange to form a secure coupling.

The retainer flange may have a bore of any appropriate configuration for engaging with the leading end of the tubular member to locate it in the recess of the mounting flange.

In a preferred embodiment of the invention, the retainer flange has a bore which diverges outwardly towards the leading end of the tubular member to define a concave segmental spherical gripping surface for gripping the convex segmental spherical surface of the leading end of the tubular member when the retainer flange is in its locked position.

In a further alternative preferred embodiment of the invention the segmental spherical surface of the mounting flange may be defined by an outer surface of the mounting flange, and the complementary segmental spherical surface of the tubular member may be defined by the bore of the tubular member diverging outwardly towards its leading end to define a concave segmental spherical surface at its leading end.

In this embodiment of the invention the retainer flange may be connected to the mounting flange to hold the leading end of the tubular member captive over the mounting flange, and the connection may be such as to allow limited axial displacement of the retainer flange relatively to the mounting flange between its locked and unlocked positions.

Further, in this embodiment, the retainer flange may comprise a trailing section and a leading section which are connected together to permit limited axial displacement between them, the leading section being engaged with the mounting flange, and the trailing section having a bore which diverges outwardly towards the leading end of the trailing section to define a concave segmental spherical gripping surface for gripping the outer surface of the leading end of the tubular member when the retainer flange is in its locked position.

The leading and trailing sections of the retainer flange may conveniently, for example, be connected together by means of bolts which extend slidably through holes in the leading section and are engaged in threaded bores in the trailing section.

The swivel coupling element includes sealing means operative between the segmental spherical surfaces of the mounting flange and the leading end of the tubular element, to provide a sealing engagement between them when the coupling element is in its coupled condition.

The invention further extends to a swivel coupling for coupling two tubular elements in sealed relationship, the swivel coupling comprising a swivel coupling element as described in which the tubular member of the swivel coupling element has its trailing end adapted for connection to one tubular element, and an annular coupling flange having a trailing end for connection to the other tubular element, the annular coupling flange having a seating face at its leading end for seating on the seating face of the mounting flange, and having means for coupling it to the retainer flange to complete the coupling and fix the leading end of the tubular member in position in the concave bore of the mounting flange.

The means for coupling the retainer flange to the annular coupling flange may be any conventional means known to those skilled in the art, or any means as described herein.

The trailing end of the tubular member, or the trailing end of the annular coupling flange, as the case may be, may be adapted for connection to a tubular element by any conventional means known to those skilled in the art. Thus, for example, the trailing end may be so adapted by being of a suitable shape for welding to a tubular element, by having a bolting flange for bolting onto a corresponding bolting flange mounted on a tubular element, or the like.

While the swivel coupling element and swivel coupling of this invention may have application in regard to the coupling of various types of tubular elements, they may have particular application in regard to the coupling of pipeline sections, particularly large diameter pipeline sections, and particularly marine pipeline sections in subsea or other hazardous environments. Thus, for example, the swivel coupling element, and swivel coupling of this invention may have particular application in coupling tubular elements in the form of marine pipeline sections used during laying or repairing or underwater pipelines for the transmission of oil, gas, or other fluent materials.

Swivel coupling elements in accordance with this invention can be made of various sizes depending upon the size of tubular element to be coupled. Thus, for example, the swivel coupling elements of this invention may be made in any size ranging from about 2 inches to about 48 inches, or in any size ranging from about 52 to about 96 inches or more in diameter.

The swivel coupling element and swivel coupling of this invention will be made of conventional materials which are appropriate for the intended application and environment of the invention during use. Thus, for example, for use in subsea environments, the swivel coupling element, and swivel coupling of this invention will be made of materials which are in accord with the ANSI or the API standards, as required.

Preferred embodiments of the invention are now described by way of example with reference to the accompanying drawings.

In the drawings:

FIG. 4 shows an axial section of yet a further embodiment of a swivel coupling element in accordance with this invention, with the coupling element being shown in a position where it is coupled to a conventional annular coupling flange (shown in dotted lines).

Figure 1:
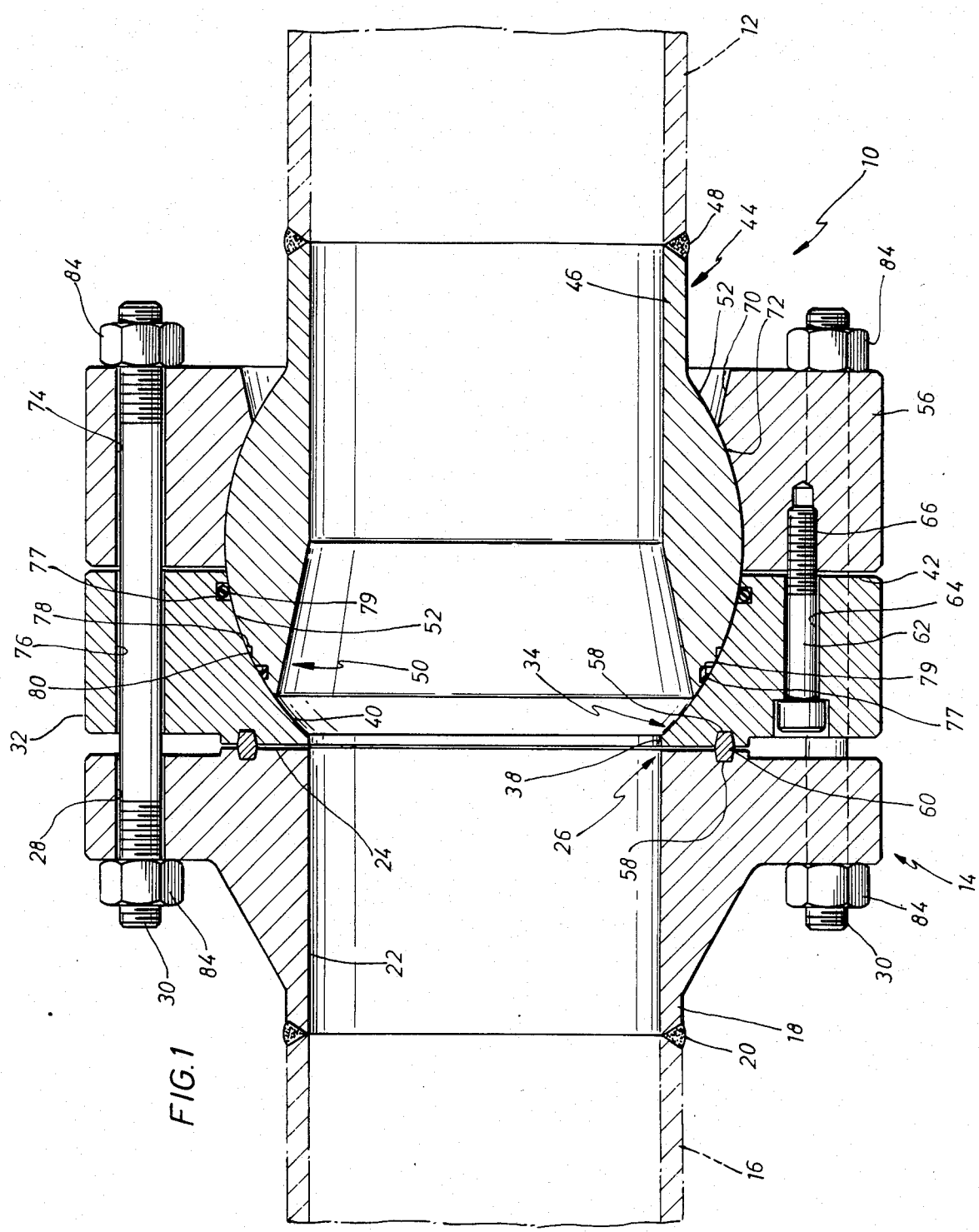
FIG. 1 shows an axial section of one embodiment of a swivel coupling element in accordance with this invention which is coupled to a conventional annular coupling flange.

With reference to FIG. 1 of the drawings, reference numeral 10 refers generally to a swivel coupling element for use in sealingly coupling a first tubular element 12 (as shown in dotted lines in FIG. 1), to an annular coupling flange 14 of conventional type.

The annular coupling flange 14 is shown in the drawing as connected to a second tubular element 16 in the form of a marine pipeline (again shown in dotted lines).

The conventional annular coupling flange 14 has a trailing end 18 which is bevelled for welding to the second tubular element 16 by means of a weld 20 in accordance with conventional techniques.

The annular coupling flange 14 further has a bore 22, a raised annular seating face 24 at its leading end 26, and a plurality of circumferentially spaced stud holes 28.

FIG. 1 shows threaded studs 30 extending through the stud holes 28.

The swivel coupling element 10 in accordance with this invention comprises an annular mounting flange 32 having a leading end 34 which defines a seating face 36 for seating on the seating face 24 of the annular coupling flange 40.

The annular mounting flange 32 has a bore 38 which extends from its leading end 34 and which diverges outwardly away from the leading end 34 to define a concave segmental spherical surface 40 which is directed towards the trailing end 42 of the mounting flange 32.

The swivel coupling element 10 further comprises a tubular member 44 having a trailing end 46 which, as shown in the drawing, is connected to a first tubular element 12 in the form of a marine pipeline, such as by welding as at 48.

The tubular member 44 has a leading end 50 which is pivotally positioned in the bore 38 of the mounting flange 32, the leading end 50 having a convex segmental spherical outer surface 52 which is complementary to the concave surface 40 to cooperate therewith.

The surface 52 thus cooperates with the surface 40 so that the tubular member 44 can be pivotally displaced relatively to the mounting flange 32 about its own axis, and so that the tubular member 44 can be pivotally displaced relatively to the mounting flange 32 to vary the inclination between the axis of the tubular member 44 and the axis of the mounting flange 32.

The swivel coupling element 10 further comprises an annular retainer flange 56 which is located on the tubular member 44 and which is axially displaceable relatively to the mounting flange between an unlocked position (the position shown in FIG. 1) where the tubular member 44 is free to pivot relatively to the mounting flange 32, and a locked position where the leading end of the tubular member is fixed in the bore 38 of the mounting flange 32.

The seating face 36 of the mounting flange 32 is a raised annular seating face corresponding to the seating face 24. Each of the seating faces 24 and 36 has an annular groove 58 wherein a metal seating ring 60 of conventional type is provided to provide a sealing engagement between the mounting flange 32 and coupling flange 14 when they are coupled together.

The retainer flange 56 is connected to the mounting flange 32 by means of bolts 62 which extend slidably through holes 64 in the mounting flange 32, and which are tapped into threaded bores 66 provided in the retainer flange 56.

Thus, as shown in FIG. 1 of the drawings, the retainer flange 56 is located axially relatively to the mounting flange 32 to hold the leading end 50 of the tubular member 44 captive within the bore 38 of the mounting flange while, at the same time, permitting the tubular member 44 to swivel relatively to the mounting flange 32 to vary the inclination between its axis and the axis of the mounting flange 32, and to permit the tubular member 44 to swivel about its own axis relatively to the mounting flange 32.

Because the bolts 62 are slidably located in the holes 64, the retainer flange 56 can be axially displaced towards the mounting flange 32 from its unlocked position as shown in FIG. 1 to its locked position where it engages with the outer surface 52 of the tubular member 44 to fix the leading end 50 in the bore 38 of the mounting flange 32. Thus further swiveling or pivotal action of the tubular member 44 will be prevented and the completed coupling will be capable of transmitting bending and tensile loads.

The retainer flange 56 has a bore 70 which diverges outwardly towards the leading end 50 of the tubular member 44 to define a concave segmental spherical gripping surface 72 for gripping the surface 52 of the leading end 50 when the retainer flange 56 is in its locked position.

The gripping surface 72 is conveniently roughened to provide a firm gripping engagement.

The retainer flange 56 is provided with circumferentially spaced stud holes 74 which are arranged in a corresponding manner to the stud holes 28 to cooperate with the threaded studs 30. Likewise, the mounting flange 32 is provided with correspondingly arranged stud holes 76.

The tubular member 44 is provided with a pair of annular grooves 77 and 78 in its outer surface 52 proximate the leading end 50, while the bore 38 of the mounting flange 32 is provided with an annular groove 77 in the surface 40 proximate its trailing end. An annular metal O-ring 80 is located in the groove 78 to provide a sealing engagement between the outer surface 52 and the concave surface 40 when the leading end 50 is fixed in position in the mounting flange 32. Wiper rings 79 are located in the two annular grooves 77.

In use, for coupling a first tubular element 12 in the form of a pipeline section to a conventional annular coupling flange 14 which is coupled to a second tubular element 16 which may be in the form of a pipeline section or other tubular component, the swivel coupling element 10 having its leading end 50 held captive in the bore 38 of the mounting flange 32 by means of the retainer flange 56 in its unlocked position, will have its trailing end 46 connected to the first tubular element 12 by, for example, welding. Thereafter the swivel coupling element can be displaced to align it with the annular coupling flange 14. The retainer flange 56 and mounting flange 32 may then be pivotally displaced about the axis of the tubular member 44 to align the stud holes 74 and 76 with the stud holes 28.

During alignment of the swivel coupling element 10 with the annular coupling flange 14, the leading end 50 of the tubular member 44 can swivel in the concave segmental spherical recess defined by the mounting flange 32 and retainer flange 56 to accommodate misalignment between the first tubular element 12 and the second tubular element 16.

The threaded studs 30 are then threaded through the aligned stud holes, whereafter nuts can be tightened on the studs 30 to draw the mounting flange 32 into sealing engagement with the annular coupling flange 14 and, at the same time, to draw the retainer flange 56 axially towards the mounting flange 32 until the retainer flange 56 is in its locked position where its gripping surface 72 engages firmly with the convex outer surface 52 of the tubular member 44 to complete the coupling.

Figure 2:
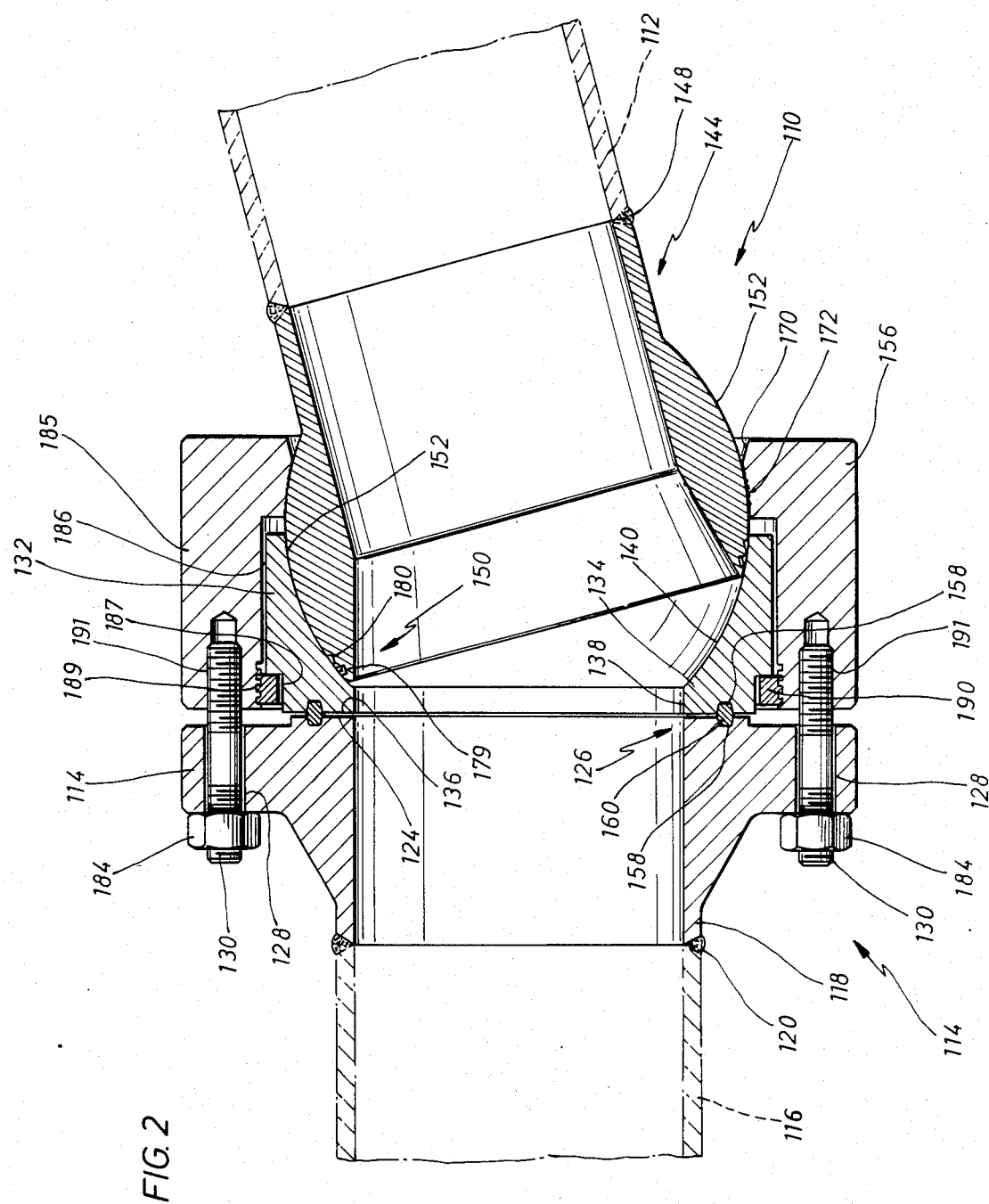
FIG. 2 shows an axial section of an alternative embodiment of a swivel coupling in accordance with this invention which is again coupled to a conventional annular coupling flange.

With reference to FIG. 2 of the drawings, reference numeral 110 refers generally to an alternative embodiment of a swivel coupling element in accordance with this invention.

The swivel coupling element 110 corresponds substantially with the swivel coupling element 10. Corresponding parts are therefore indicated by corresponding reference numerals except that the suffix "1" is used before each numeral.

In the swivel coupling 110 the retainer flange 156 has a tubular portion 185 which extends axially therefrom towards the annular coupling flange 114. Further, the annular mounting flange 132 has a cylindrical outer surface which is slidably receivable with the tubular portion 185 of the retainer flange 156.

The mounting flange 132 further has an annular recess 187 which defines a radially extending annular shoulder 188.

The tubular portion 185 of the retainer flange 156 has an internally threaded zone 189, and the swivel coupling element 110 includes a threaded retainer ring 190 which is engaged with the threaded portion 189 and abuts the shoulder 188 thereby locating the mounting flange 132 axially relatively to the retainer flange 56, and thereby holding the leading end 150 of the tubular member 144 captive in the bore 138 of the mounting flange 132.

As shown in FIG. 2 of the drawings, the retainer flange 156 is in its unlocked position where the leading end 150 of the tubular member 144 is free to swivel in the bore 138 of the mounting flange 132.

The swivel coupling 110 includes a plurality of circumferentially spaced, threaded stud holes 191 which are arranged in a corresponding manner to the stud holes 128 of the annular coupling flange 114. Studs 130 are engaged in the threaded stud holes 191 and extend slidably through the stud holes 128 of the annular coupling flange 114.

For completing the swivel coupling 110, the studs 130 are threaded through the stud holes 128, whereafter nuts 184 are tightened onto the studs 130 to draw the seating faces 136 and 124 into sealing engagement and, at the same time, to displace the retainer flange 156 axially relatively to the mounting flange 132 towards the annular coupling flange 114 so that the gripping surface 172 engages with the convex outer surface 152 of the tubular member 144 to again fix it in its correct attitude in the swivel coupling element 110, whereupon the swivel coupling so formed is capable of resisting tensile and bending stresses.

Figure 3:
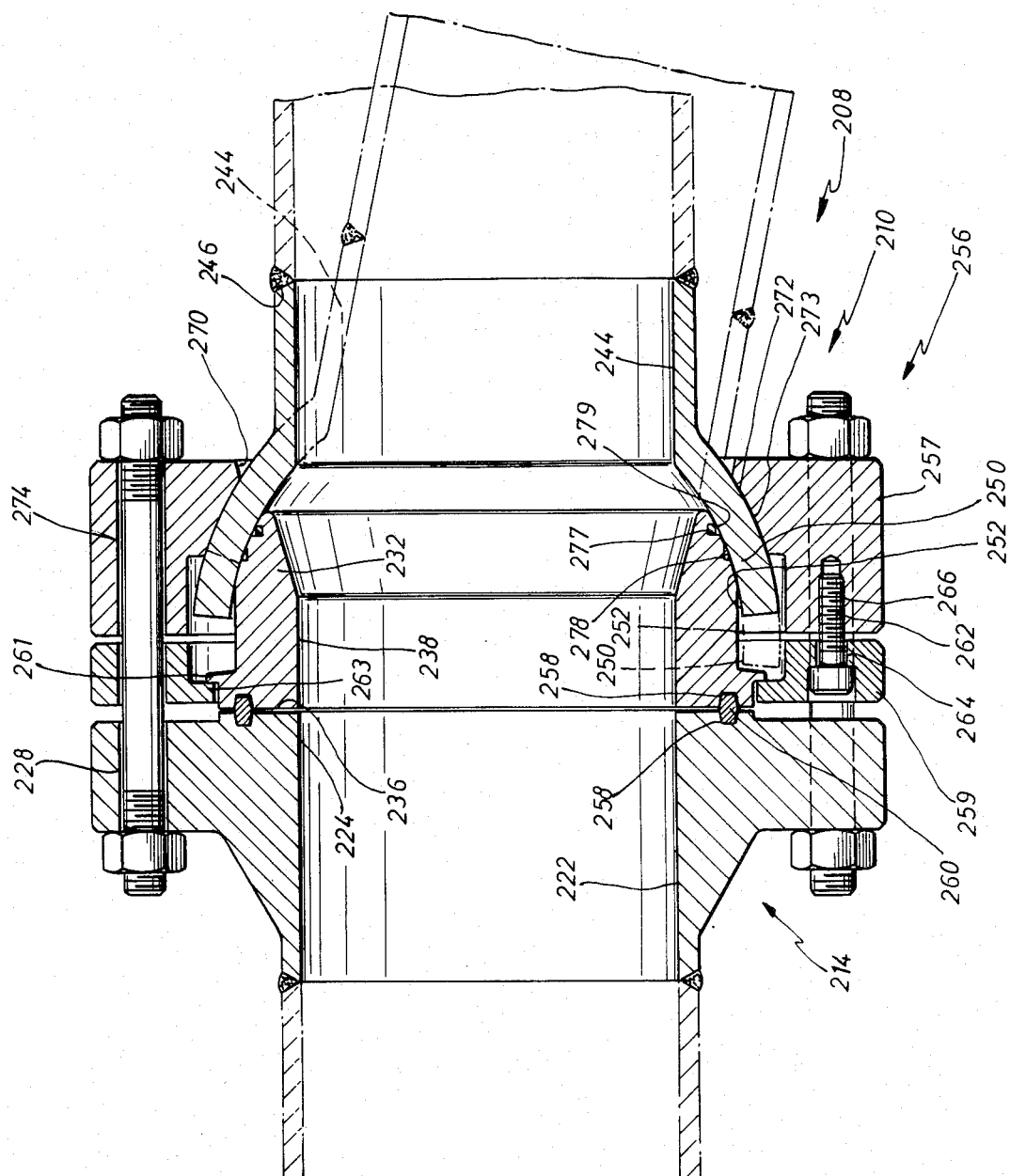
FIG. 3 shows an axial section of yet a further embodiment of a swivel coupling in accordance with this invention which is again coupled to a conventional annular coupling flange to constitute a swivel coupling in accordance with this invention.

With reference to FIG. 3 of the drawings, reference numeral 208 refers generally to a swivel coupling in accordance with this invention, comprising a swivel coupling element 210 and an annular coupling flange 214 which is coupled thereto.

The swivel coupling element 210 and the annular coupling flange 214 correspond generally with the swivel coupling element 10 and annular coupling flange 14 of FIG. 1. Corresponding parts are therefore indicated by corresponding reference numerals except that the prefix "2" has been used before the reference numerals.

In the embodiment illustrated in FIG. 3 of the drawings, the segmental spherical surface 240 of the mounting flange 232 is defined by an outer surface 240 of the mounting flange, while the complementary segmental spherical surface 252 of the tubular member 244 is defined by the bore of the tubular member 244 diverging outwardly towards its leading end 250 to define a concave segmental spherical surface at its leading end within which the mounting flange 232 is received so that the segmental spherical surfaces 240 and 252 can cooperate in a similar manner as discussed with reference to the swivel coupling element 10 of FIG. 1.

In this embodiment of the invention the retainer flange 256 comprises a trailing section 257 and a leading section 259 which are connected together to permit limited axial displacement between them.

The leading section 259 is so connected to the trailing section 257 by means of bolts 262 which extend slidably through holes 264 provided in the leading section 259, and which are engaged in circumferentially spaced threaded bores 266 provided in the trailing section 257.

The trailing section 257 has a bore 270 which diverges outwardly towards the leading end of the trailing section 257 to define a concave segmental spherical gripping surface 272 which is roughened for gripping the outer surface 273 of the leading end 250 of the tubular member 244 when the retainer flange 256 is in its locked position.

Because the leading end 250 of the tubular member 244 has a constant wall thickness, the outer surface 273 of the leading end 250 will have a convex segmental spherical surface corresponding to the surface 252 for engagement by the gripping surface 272.

As shown in FIG. 3 of the drawings, when the retainer flange 256 is in its unlocked position, the tubular member 244 can be swiveled between a position as shown in solid lines where its axis is in line with the axis of the mounting flange 232, and a position as shown in dotted lines in which its axis is inclined to the axis of the mounting flange through an angle of approximately 15 degrees.

The leading section 259 of the retainer flange 256 is engaged with the mounting flange 232 to thereby locate the retainer flange 256 relatively to the mounting flange 232 and hold the leading end 250 in a captive position between the retainer flange 256 and the mounting flange 232.

The leading section 259 is engaged with the mounting flange 232 by the mounting flange 232 having a radially extending annular lip 261 which engages with a radially inwardly extending annular lip 263 of the leading section 259.

In use, for completing the swivel coupling 208 with the tubular member 244 connected to one tubular element and with the trailing end of the annular coupling flange 214 connected to a second tubular element, the swivel coupling element 210 can be displaced onto the annular coupling flange 214 for the seating surfaces 236 and 224 to seat. During such displacement the tubular member 244 will swivel relatively to the mounting flange 232 to accommodate any misalignment between the tubular elements being connected.

Threaded studs can then be threaded through the stud holes 228 and 274 which are, as before, provided at circumferentially spaced intervals. Nuts can then be tightened upon the threaded studs [not shown in FIG. 3] to draw the trailing section 257 towards the leading section 259 and towards the annular coupling flange 214 until the gripping surface 272 engages firmly with the surface 273 to provide a sealing engagement between the surfaces 240 and 252 and thus complete the swivel coupling 208.

With reference to FIG. 4 of the drawings, reference 310 refers generally to an alternative embodiment of a swivel coupling element in accordance with this invention.

The swivel coupling element 310 corresponds substantially with the swivel coupling element 10 of FIG. 1. Corresponding parts of the swivel coupling element 310 are therefore identified with corresponding reference numerals to those used in FIG. 1 of the drawings.

The swivel coupling element 310 differs from the swivel coupling element 10 of FIG. 1, in that the element 310 includes spacer means which is operative while the retainer flange 56 is in its unlocked position to facilitate rotation and swivel motion of the tubular member 44 relatively to the annular mounting flange 32 before the retainer flange 56 is displaced into its locked position.

The spacer means is operative between the mounting flange 32 and the retainer flange 56, and is in the form of resilient bias means 93.

The bias means 93 comprises a plurality of spacer springs 93 which are located on preloading bolts 362 which extend slidably through holes 64 in the mounting flange 32, and which are threaded into threaded bores 66 provided in the retainer flange 56.

Each hole 64 has a counter sunk bore 95 for housing the spacer spring 93.

In use, the preloading bolts 362 are tensioned against the spacer springs 93 to thereby capture the leading end 50 of the tubular member 44 with a controlled degree of friction within the mounting flange 32 and the retainer flange 56. In other words, the leading end 50 of the tubular element 44 is located in the coupling element 310 so that the convex segmental spherical outer surface 52 of the leading end 50 engages frictionally with the concave surfaces 40 and 72.

By simply adjusting the preloading bolts 362 and thus the compression of the spacer springs 93, the spacing between the mounting flange 32 and retainer flange 56 will be adjusted to adjust the frictional cooperation between the surface 52 and the complementary surfaces 40 and 72.

This arrangement provides the advantage that the frictional cooperation can readily be controlled to permit displacement of the tubular member 44 relatively to the flanges 32 and 56, whether it be a rotational displacement or a swivel displacement, under a desired degree of force.

The controlled frictional engagement will thus ensure that a particular orientation of the tubular element 44 relatively to the flange 32 and 56 can be maintained during final handling of the coupling element 310 and during alignment thereof with the conventional annular coupling flange 14.

Once the nuts 84 have been tightened on the threaded studs 30, the spacer springs 93 will be accommodated in the counter sunk bores 95. They will therefore not interfere with the makeup of a coupling from the coupling element 310.

The embodiments of the invention as illustrated in the drawings provide the particular advantages that the swivel coupling element incorporates the swivel mechanism, that the mounting flange and retainer flange are located on the leading end of the tubular member with the leading end held captive therein, that the swivel coupling element can be coupled to any conventional annular coupling flange having a matching seating face, that effective seals can readily be effected, and that any swivel action to accommodate misalignment can readily be accommodated.

It will be appreciated that, if desired, conventional hydraulic means may be incorporated in the swivel coupling element to swivel the tubular member relatively to the mounting flange for alignment of the stud holes, and to couple the swivel coupling element to the annular coupling flange.

We claim:

1. A swivel coupling element adapted to be coupled to a conventional or standard annular coupling flange which has a generally planar leading end defined by a leading end of an annular flange portion and by a seating face proximate the leading end, the annular flange portion having a plurality of circumferentially spaced stud holes for use in coupling the conventional or standard annular coupling flange to another annular coupling flange, the swivel coupling element comprising:
   an annular mounting flange having a trailing end, having a leading end which defines a seating face for cooperating with the seating face of such a conventional or standard annular coupling flange, and having a segmental spherical surface which is on the trailing side of the leading end of the annular mounting flange;
   (b) a tubular member having a trailing end for connection to a tubular element, and having a leading end having a segmental spherical surface which is complementary to the segmental spherical surface of the mounting flange to cooperate therewith; and
   (c) an annular retainer flange which has a bore through which the trailing end of the tubular member extends, the bore having a minimum diameter which is smaller than the maximum diameter of the leading end of the tubular member, the annular retainer flange being connected to the mounting flange by connection means for preventing axial separation of the two flanges and thus form the assembled swivel coupling element in which the leading end of the tubular member is held captive between the annular retainer flange and the annular mounting flange while permitting pivotal displacement of the tubular member relatively to the annular mounting flange, and which, in its assembled condition, is adapted to be coupled to such a conventional annular coupling flange, the annular retainer flange having a plurality of circumferentially spaced stud holes which correspond with the stud holes of such a conventional or standard annular coupling flange for receiving bolts or studs for bolting the retainer flange of the assembled swivel coupling element onto such a conventional annular coupling flange to thereby generally seal the seating face of the annular mounting flange with a seating face of such a conventional annular coupling flange, and to thereby draw the annular retainer and mounting flanges towards each other into locking engagement with the leading end of the tubular member for fixing the tubular member relatively to the annular mounting flange and generally seating a portion of the segmental spherical surface of the tubular member against a portion of the segmental spherical surface of the mounting flange.

2. A swivel coupling element according to claim 1, in which the annular retainer flange is connected to the annular mounting flange by means of connection means which is connected to one of these two flanges and is slidably connected to the other of these two flanges to allow limited relative axial displacement of these two flanges.

3. A swivel coupling element according to claim 1, in which the connection between the annular retainer flange and the annular mounting flange allows limited axial displacement of the retainer flange relatively to the mounting flange.

4. A swivel coupling element according to claim 3, in which the retainer flange is connected to the mounting flange by means of connection means in the form of bolts which extend slidably through holes in the mounting flange and are engaged in threaded bores provided in the retainer flange.

5. A swivel coupling element according to claim 1, in which the mounting flange has a plurality of corresponding stud holes for alignment with the stud holes of the retainer flange to receive bolts or studs when inserted through the stud holes of the retainer flange.

6. A swivel coupling element according to claim 1, including annular seal means between the segmental spherical surface of the mounting flange and the segmental spherical surface of the leading end of the tubular member to form a sealed engagement between them when the retainer and mounting flanges are drawn into locking engagement with the leading end of the tubular member.

7. A swivel coupling element according to claim 6, in which the seal means comprises a metal seal for forming a metal-to-metal seal.

8. A swivel coupling element according to claim 6 or claim 7, including wiper rings which are located on opposed sides of the annular seal means between the segmental spherical surface of the mounting flange and the complementary segmental surface of the leading end of the tubular member to protect the annular seal means before the tubular member is fixed relatively to the annular mounting flange.

9. A swivel coupling element according to claim 1, in which the seating face of the mounting flange has an annular groove for receiving a sealing ring to form a sealed engagement with a seating face of such a conventional annular coupling flange when the swivel coupling element is coupled to such an annular coupling flange.

10. A swivel coupling element according to claim 1, in which the segmental spherical surface of the mounting flange comprises an outer convex surface of the mounting flange, and in which the complementary segmental spherical surface of the tubular member comprises the bore of the tubular member which diverges outwardly towards its leading end to define a concave segmental spherical surface at its leading end.

11. A swivel coupling element according to claim 10, in which the retainer flange comprises a trailing section and a leading section which are connected together to permit limited axial displacement between them, in which the leading section is engaged with the mounting flange, and in which the bore of the trailing section diverges outwardly towards the leading end of the trailing section to define a concave gripping surface for gripping the outer surface of the leading end of the tubular member when the trailing section of the retainer flange is drawn into locking engagement with the leading end of the tubular member.

12. A swivel coupling element according to claim 11, in which the concave gripping surface is a segmental spherical surface.

13. A swivel coupling element according to claim 1 or claim 10, in which the retainer flange is connected to the mounting flange by means of a retainer ring which is mounted on the retainer flange and engages with a radially extending shoulder of the mounting flange.

14. A swivel coupling element according to claim 13, in which the retainer ring is a threaded retainer ring.

15. A swivel coupling element according to claim 1, in which the retainer flange has a bore which diverges outwardly towards the leading end of the tubular member to define a concave segmental spherical gripping surface for gripping the segmental spherical surface of the leading end of the tubular member when the retainer flange is drawn into locking engagement with the leading end of the tubular member.

16. A swivel coupling element according to claim 1 or claim 10, including spacer means which is operative between the mounting flange and the retainer flange to maintain them in spaced relationship while the retainer flange is in its unlocked position to facilitate displacement of the tubular member relatively to the mounting flange.

17. A swivel coupling element according to claim 16, in which the spacer means is in the form of bias means.

18. A swivel coupling element according to claim 16, in which the spacer means is in the form of adjustable bias means which is adjustable to control the degree of friction with which the tubular member is located between the mounting flange and the retainer flange.

19. A swivel coupling element according to claim 16, in which the retainer flange is connected to the mounting flange by means of bolts which cooperate slidably with one of the flanges and are engaged with the other flange, and in which the spacer means comprises spacer springs which are located on the bolts.

20. A swivel coupling element according to claim 19, in which the bolts are adjustable to adjust the bias effect of the spacer springs and thereby adjust the degree of friction with which the tubular member is located between the mounting flange and the retainer flange while the retainer flange is in its unlocked position.

21. A swivel coupling element according to claim 1, claim 10, claim 11, or claim 13, in which the connection means is independent of bolting means for bolting the swivel coupling element to such a conventional annular coupling flange.

22. A swivel coupling element for coupling a tubular element to a conventional annular coupling flange which has a generally planar leading end defined by a leading end of an annular flange portion and by a seating face proximate the leading end, the annular flange portion having a plurality of circumferentially spaced stud holes for use in coupling the conventional annular coupling flange to another annular coupling flange, the swivel coupling element comprising:
(a) an annular mounting flange having a trailing end, having a leading end which defines a seating face for cooperating with the seating face of such a conventional annular coupling flange, and having a segmental spherical surface which is on the trailing side of the leading end of the annular mounting flange;
(b) a tubular member having a trailing end for connection to a tubular element, and having a leading end having a segmental spherical surface which is complementary to the segmental spherical surface of the mounting flange to cooperate therewith;
(c) an annular retainer flange which has a bore through which the trailing end of the tubular member extends, the bore of the retainer flange diverging towards the leading end of the tubular member to define a concave gripping surface for engaging with a convex outer surface of the leading end of the tubular member; and
(d) connection means displaceably connecting the annular retainer flange to the annular mounting flange to prevent axial separation of the two flanges and thus maintain the swivel coupling element in an assembled condition with the leading end of the tubular member held captive between the segmental spherical surface of the mounting flange and the concave gripping surface of the bore of the retainer flange, while permitting the tubular member to swivel relatively to the mounting flange;

the annular retainer flange of the assembled swivel coupling element being adapted to be bolted to such a conventional annular coupling flange by means of bolting means independent of the connection means to couple the swivel coupling element to such a conventional annular coupling flange, and thereby draw the concave gripping surface into engagement with the convex outer surface of the leading end of the tubular member, thereby draw the leading end of the tubular member into engagement with the segmental spherical surface of the mounting flange to thereby lock the tubular member against relative displacement, and thereby draw the seating face of the annular mounting flange into seating association with the seating face of such a conventional annular coupling flange.

23. A swivel coupling element according to claim 22, in which the annular retainer flange has a plurality of circumferentially spaced stud holes which correspond with the stud holes of such a conventional coupling flange for receiving bolts or studs to bolt the retainer flange to such a conventional annular coupling flange.

24. A swivel coupling element according to claim 22 or claim 23, in which the connection means is connected to one of the two connected flanges and is slidably connected to the other of the two connected flanges to permit limited relative axial displacement of the two connected flanges.

25. A swivel coupling element according to claim 24, in which the connection means comprises bolts which extend slidably through holes in one of the two flanges and are engaged in threaded bores in the other of the two flanges.

26. A swivel coupling element according to claim 22, including annular seal means between the segmental spherical surface of the mounting flange and the segmental spherical surface of the leading end of the tubular member to form a sealed engagement between them when the tubular member is drawn into locking engagement with the segmental spherical surface of the mounting flange.

27. A swivel coupling element according to claim 22, in which the segmental spherical surface of the mounting flange comprises an outer convex surface of the mounting flange, and in which the complementary segmental spherical surface of the tubular member comprises the bore of the tubular member which diverges outwardly towards its leading end to define a concave surface at its leading end.

28. Apparatus for forming an assembled swivel coupling element for coupling a tubular element to a conventional or standard annular coupling flange which has a generally planar leading end defined by a leading end of an annular flange portion and by a seating face proximate the leading end, the annular flange portion having a plurality of circumferentially spaced stud holes for use in coupling the conventional annular coupling flange to another annular coupling flange, the apparatus comprising:
  (a) an annular mounting flange having a trailing end, having a leading end which defines a seating face for cooperating with the seating face of such a conventional or standard annular coupling flange, and having a segmental spherical surface which is on the trailing side of the leading end of the annular mounting flange;
  (b) a tubular member having a trailing end for connection to a tubular element, and having a leading end having a segmental spherical surface which is complementary to the segmental spherical surface of the mounting flange to cooperate therewith; and
  (c) an annular retainer flange which has a bore through which the trailing end of the tubular member can extend, the bore having a minimum diameter which is smaller than the maximum diameter of the leading end of the tubular member, the annular retainer flange being adapted to be connected to the mounting flange by means of connection means to prevent axial separation of the two flanges and thus form the assembled swivel coupling element by capturing the leading end of the tubular member between the annular retainer flange and the annular mounting flange while permitting pivotal displacement of the tubular member relatively to the annular mounting flange, the swivel coupling element when in its assembled condition being adapted to be coupled to such a standard annular coupling flange, the annular retainer flange having a plurality of circumferentially spaced stud holes which correspond with stud holes of such a standard annular coupling flange for receiving bolts or studs for bolting the retainer flange onto such a conventional annular coupling flange when the apparatus is in its assembled condition to thereby associate the seating face of the annular mounting flange with the seating face of such a conventional or standard annular coupling flange, and to thereby draw the annular retainer and mounting flanges towards each other into locking engagement with the leading end of the tubular member for fixing the tubular member relatively to the annular mounting flange.

29. Apparatus for forming a swivel coupling element for coupling a tubular element to a conventional annular coupling flange which has a generally planar leading end defined by a leading end of an annular flange portion and by a seating face proximate the leading end, the annular flange portion having a plurality of circumferentially spaced stud holes for use in coupling the conventional annular coupling flange to another annular coupling flange, the apparatus comprising:
  (a) an annular mounting flange having a trailing end, having a leading end which defines a seating face for cooperating with the seating face of such a conventional annular coupling flange, and having a segmental spherical surface which is on the trailing side of the leading end of the annular mounting flange;
  (b) a tubular member having a trailing end for connection to a tubular element, and having a leading end having a segmental spherical surface to cooperate with the segmental spherical surface of the annular mounting flange;
  (c) an annular retainer flange which has a bore through which the trailing end of the tubular member can extend, the bore of the retainer flange diverging towards the leading end of the retainer flange to define a concave gripping surface for engaging with a convex outer surface of the leading end of the tubular member; and
  (d) connection means for displaceably connecting the annular retainer flange to the annular mounting flange to thereby prevent axial separation of these two flanges and to thereby form the assembled swivel coupling element in which the leading end of the tubular member will be held captive between the segmental spherical surface of the mounting flange and the concave gripping surface of the bore of the retainer flange, while permitting the tubular member to swivel relatively to mounting flange;
the annular retainer flange being adapted to be bolted to such a conventional annular coupling flange by means of bolting means independent of the connection means to couple the swivel coupling element when assembled to such an annular coupling flange and thereby draw the concave gripping surface into engagement with the convex outer surface of the leading end of the tubular member, thereby draw the leading end of the tubular member into engagement with the segmental spherical surface of the mounting flange to thereby lock the tubular member against relative displacement, and thereby draw the seating face of the annular mounting flange into seating association with a seating face of such a conventional annular coupling flange.

30. A swivel coupling element for coupling a tubular element to a conventional annular coupling flange of the type used in the oil and gas pipeline industry which has a leading end defined by an annular flange portion and by an annular seating face proximate the leading end, the swivel coupling element comprising:
 (a) an annular mounting flange having a trailing end, having a leading end which defines a seating face for cooperating with the seating face of such a conventional annular coupling flange, and having a segmental spherical surface which is on the trailing side of the leading end of the annular mounting flange;
 (b) a tubular member having a trailing end for connection to a tubular element, and having a leading end having a segmental spherical surface to cooperate with the segmental spherical surface of the annular mounting flange;
 (c) an annular retainer flange which has a bore through which the trailing end of the tubular member extends, the bore of the retainer flange diverging towards the leading end of the tubular member to define a concave gripping surface for engaging with a convex outer surface of the leading end of the tubular member; and
 (d) connection means connecting the annular retainer flange to the annular mounting flange in axially spaced relationship to prevent axial separation of these two flanges and thus maintain the swivel coupling element in an assembled condition with the leading end of the tubular member held captive between the segmental spherical surface of the mounting flange and the concave gripping surface of the bore of the retainer flange while permitting the tubular member to swivel relatively to the mounting flange;
the annular retainer flange of the assembled swivel coupling element being adapted to be bolted to such a conventional annular coupling flange by means of bolting means independent of the connection means to couple the swivel coupling element to such a conventional annular coupling flange, and thereby draw the concave gripping surface into engagement with the convex outer surface of the leading end of the tubular member, thereby draw the leading end of the tubular member into engagement with the segmental spherical surface of the mounting flange to thereby lock the tubular member against relative displacement, and thereby draw the seating face of the annular mounting flange into seating association with the seating face of such a conventional annular coupling flange.

31. A swivel coupling element for coupling a tubular element to a conventional annular coupling flange which has a generally planar leading end defined by a leading end of an annular flange portion and by a seating face proximate the leading end, the annular flange portion having a plurality of circumferentially spaced stud holes for use in coupling the conventional annular coupling flange to another annular coupling flange, the swivel coupling element comprising:
 (a) an annular mounting flange having a trailing end, having a leading end which defines a seating face for cooperating with the seating face of such a conventional annular coupling flange, and having a segmental spherical surface;
 (b) a tubular member having a trailing end for connection to a tubular element, and having a leading end having a segmental spherical surface which is complementary to the segmental spherical surface of the mounting flange to cooperate therewith;
 (c) an annular retainer flange which has a bore through which the trailing end of the tubular member extends, the retainer flange defining a gripping surface which has a smaller diameter than the maximum diameter of the leading end of the tubular member for engaging with the leading end of the tubular member; and
 (d) connection means connecting the annular retainer flange to the annular mounting flange to prevent axial separation of these two flanges and thus maintain the swivel coupling element in an assembled condition with the leading end of the tubular member held captive between the segmental spherical surface of the mounting flange and the gripping surface of the retainer flange while permitting the tubular member to swivel relatively to the mounting flange;
the annular retainer flange being adapted to be bolted to such a conventional annular coupling flange by means of bolting means to couple the swivel coupling element when in its assembled condition to such a conventional annular coupling flange, and thereby draw the gripping surface into engagement with the leading end of the tubular member, thereby draw the leading end of the tubular member into engagement with the segmental spherical surface of the mounting flange to thereby lock the tubular member against relative displacement, and thereby draw the seating face of the mounting flange into seating association with the seating face of such a conventional annular coupling flange.

32. A swivel coupling element according to claim 31, in which the annular retainer flange is adapted to be bolted to the annular flange portion of such a conventional annular coupling flange by bolting means independent of the connection means.

33. A swivel coupling element according to claim 31, in which the connection means displaceably connects the annular retainer flange to the annular mounting flange to thereby allow them to be drawn axially towards each other when the annular retainer flange is bolted to such a conventional annular coupling flange.

34. A swivel coupling element according to claim 31, in which the bore of the retainer flange diverges in the direction of the leading end of the tubular member to define a concave gripping surface for engaging with the convex outer surface of the leading end of the tubular member.

35. A swivel coupling element according to claim 31, including sealing means between the segmental spherical surface of the mounting flange and the segmental spherical surface of the leading end of the tubular member to form a metal-to-metal seal between them when the swivel coupling element is bolted to such an annular coupling flange.

36. A swivel coupling element according to claim 35, in which the seating face has an annular groove for receiving a metal sealing ring to engage sealingly with a seating face of an annular coupling flange.

37. A swivel coupling element according to claim 31, including bolts which constitute the connection means, the bolts being shaped to extend slidably through bores of one of the flanges, and being engaged in bores of the other of the flanges.

38. A swivel coupling element according to claim 31, including spacer means which is operative between the mounting flange and the retainer flange to maintain them in spaced relationship while the retainer flange is in its unlocked condition to facilitate displacement of the tubular member reltively to the mounting flange.

39. A swivel coupling element according to claim 38, in which the spacer means is in the form of bias means.

40. A swivel coupling element according to claim 38, in which the spacer means is in the form of adjustable bias means which is adjustable to control the degree of friction with which the tubular member is located between the mounting flange and the retainer flange.

41. A swivel coupling element according to claim 38, in which the retainer flange is connected to the mounting flange by means of bolts which cooperate slidably with one of the flanges and are engaged with the other flange, and in which the spacer means comprises spacer springs which are located on the bolts.

42. A swivel coupling element according to claim 41, in which the bolts are adjustable to adjust the bias effect of the spacer springs and thereby adjust the degree of friction with which the tubular member is located between the mounting flange and the retainer flange while the retainer flange is in its unlocked position.

43. Apparatus for forming an assembled swivel coupling element for coupling a tubular element to a conventional annular coupling flange which has a generally planar leading end defined by a leading end of an annular flange portion and by a seating face proximate the leading end, the annular flange portion having a plurality of circumferentially spaced stud holes for use in coupling the conventional annular coupling flange to another annular coupling flange, the apparatus comprising:
(a) an annular mounting flange having a trailing end, having a leading end which defines a seating face for cooperating with the seating face of such a conventional annular coupling flange, and having a segmental spherical surface which is on the trailing side of the leading end of the annular mounting flange;
(b) a tubular member having a trailing end for connection to a tubular element, and having a leading end having a segmental spherical surface which is complementary to the segmental spherical surface of the mounting flange to cooperate therewith;
(c) an annular retainer flange which has a bore through which the trailing end of the tubular member can extend, the retainer flange defining a gripping surface which has a smaller diameter than the maximum diameter of the leading end of the tubular member for engaging with the leading end of the tubular member; and
(d) connection means for connecting the annular retainer flange to the annular mounting flange to thereby prevent axial separation of the two flanges and to thereby form the assembled swivel coupling element in which the leading end of the tubular member will be held captive between the segmental spherical surface of the mounting flange and the gripping surface of the retainer flange while permitting the tubular member to swivel relatively to the mounting flange;
the swivel coupling element when formed into its assembled condition being adapted to be coupled as an assembled element to such a conventional annular coupling flange,
the annular retainer flange being adapted to be bolted to such a conventional annular coupling flange by means of bolting means to couple the swivel coupling element when assembled to such an annular coupling flange and thereby draw the gripping surface into engagement with the outer surface of the leading end of the tubular member, thereby draw the leading end of the tubular member into engagement with the segmental spherical surface of the mounting flange to thereby lock the tubular member against relative displacement, and thereby draw the seating face of the annular mounting flange into seating association with a seating face of such a conventional annular coupling flange.

44. A method of correcting for the misalignment of a subsea, tubular pipe, the pipe having at a free end a standard annular coupling flange including a seating face, the method comprising the steps of:
providing a swivel coupling element comprising an annular mounting flange having a seating face and a segmental spherical surface, a tubular member having a segmental spherical surface which is complemental to the segmental spherical surface of the mounting flange, and a retainer flange;
preassembling the swivel coupling element with the mounting flange and retainer flange coupled to hold captive the tubular member;
manipulating the mounting flange to a position proximate said free end with the seating face of the mounting flange in juxtaposed relation to the seating face of the standard coupling flange;
attaching the swivel coupling element to the standard coupling flange with the retainer flange and mounting flange coupled to hold shiftably captive the tubular element in an assembled relation;
aligning the tubular element in the desired orientation relative to said standard coupling flange; and
drawing the assembled swivel coupling element towards the standard coupling flange to
establish a seal between the seating face of the standard coupling flange and the seating face of the mounting flange, and
establish a seal between the segmental spherical surface of the mounting flange and the segmental spherical surface of the tubular element.

45. A method according to claim 44, including the step of: providing spacer means for biasing the complemental segmental spherical surfaces of the mounting flange and tubular member away from each other to facilitate alignment of said tubular element prior to said drawing step.

46. A swivel coupling element adapted to be connected to a pipe free end to provide a misalignment connection thereto, where the pipe free end includes a conventional annular coupling flanged ring joint having an annular, generally planar seating face at the leading end thereof, the swivel coupling element comprising:
an annular mounting flange having an annular, generally planar engagement face adapted for sealingly engaging the seating face of the conventional ring joint, and having an annular, segmental spherical surface axially spaced from the engagement face;
a tubular member having a segmental spherical surface adapted to complementally engage said segmental spherical surface of said mounting flange and having a radially outwardly diverging capture surface;
retainer flange means having a radially inwardly extending gripping surface for abutting said capture surface for holding said tubular member in captive relation relative said mounting flange with portions of said complemental segmental surfaces adjoining;

preassembly means for coupling said mounting flange and retainer flange in preassembled relation with said tubular member held in said captive relation and said complemental segmental spherical surface shiftable relative each other, said preassembly means being operable for preventing axial separation of said mounting and retainer flanges and for permitting axial movement of one of said flanges towards the other flange; and means for fastening said preassembled mounting and retainer flanges to said conventional ring joint with said engagement face of said mounting flange adjoining said seating face of said conventional ring joint, said fastening means being operable for axially drawing said retainer flange towards said mounting flange to establish a seal between said mounting flange engagement face and said ring joint seating face, establishing a seal between said complemental spherical surfaces, and for generally preventing relative shifting movement between said complemental spherical surfaces.

47. The coupling element according to claim 46, wherein, the tubular member presents a radially outwardly, arcuate flare at its distal end to define a radially inwardly oriented segmental spherical surface, and the mounting flange presents an arcuate segmental spherical surface radially inwardly converging away from said engagement face.

48. The coupling element according to claim 46, wherein, the tubular member presents a ball-shaped distal end to define the segmental spherical surface, and the mounting flange presents an arcuate, capshaped, segmental spherical surface radially outwardly diverging away from said engagement face.

49. The coupling element according to claim 46, wherein, said preassembly means includes a radially inwardly oriented tab fastenable to the retainer flange and the mounting flange includes a shoulder adapted for engaging the tab in said preassembled relation to prevent axial separation of the mounting and retainer flanges.

50. The coupling element according to claim 49, wherein, said retainer flange includes an annular radially inwardly oriented threaded surface and said tab comprises an annular ring threadingly fastenable to said threaded surface.

51. The coupling element according to claim 46, wherein, said mounting and retainer flanges each include complementally alignable bolt-receiving bores and said preassembly means comprises an elongated threaded bolt, one of said bores being threaded for engaging said bolt with the bolt shiftably received through the other bore to prevent axial separation of the mounting and retainer flanges and allow axial movement of said flanges towards each other.

52. The coupling element according to claim 46, said conventional annular ring joint having a plurality of circumferentially spaced-apart bolt holes, said fastening means comprising a plurality of spaced-apart bores through at least one of said flanges, the bores being alignable with the respective bolt holes, and further comprising a plurality of studs operably receivable in said aligned bolt holes and bores for connecting said conventional ring joint to said one flange.

53. The coupling element according to claim 52, wherein, said retainer flange includes a plurality of threaded bores alignable with said bolt holes for operably receiving said studs to connect said retainer flange to said conventional ring joint.

54. The coupling element according to claim 52, wherein, said retainer flange and mounting flange each present axially-oriented, alignable spaced bores, with the bores being alignable for operably receiving the studs to connect the flanges to the conventional ring.

55. The coupling element according to claim 46, wherein, said preassembly means and fastening means are separate and operate independently from each other.

* * * * *